US006949850B2

United States Patent
Dairi (12) United States Patent
Dairi (10) Patent No.: US 6,949,850 B2
(45) Date of Patent: Sep. 27, 2005

(54) STEPPING MOTOR

(75) Inventor: Akira Dairi, Miyota-Machi (JP)

(73) Assignee: Minebea Co., Inc. (JP)

( * ) Notice: Subject to any disclaimer, the term of this patent is extended or adjusted under 35 U.S.C. 154(b) by 0 days.

(21) Appl. No.: 10/688,475

(22) Filed: Oct. 17, 2003

(65) Prior Publication Data

US 2004/0140728 A1 Jul. 22, 2004

(30) Foreign Application Priority Data

Oct. 22, 2002 (JP) ........................................ 2002-307271

(51) Int. Cl.⁷ .............................................. H02K 5/00
(52) U.S. Cl. ........................................ 310/89; 310/258
(58) Field of Search ......................... 310/89, 254, 258, 310/259, 216, 217, 49 R (56) References Cited

U.S. PATENT DOCUMENTS

| | | | | |
|---|---|---|---|---|
| 1,477,773 A | * | 12/1923 | Schou et al. | 310/258 |
| 2,650,992 A | * | 9/1953 | Forss et al. | 310/42 |
| 4,076,989 A | * | 2/1978 | Watson | 310/89 |
| 4,118,644 A | * | 10/1978 | Schulte et al. | 310/42 |
| 4,315,176 A | * | 2/1982 | Sendo et al. | 310/83 |
| 5,041,749 A | * | 8/1991 | Gaser et al. | 310/156.22 |
| 5,057,729 A | * | 10/1991 | Tominaga | 310/89 |
| 5,287,030 A | * | 2/1994 | Nutter | 310/89 |
| 5,514,922 A | * | 5/1996 | Yabushita et al. | 310/45 |
| 5,945,759 A | * | 8/1999 | Tanaka et al. | 310/90 |
| 5,952,751 A | * | 9/1999 | Yamakoshi et al. | 310/89 |

FOREIGN PATENT DOCUMENTS

| | | |
|---|---|---|
| DE | 421771 C | 11/1925 |
| DE | 945774 C | 7/1956 |
| DE | 1638265 A | 8/1971 |
| DE | 2149972 A | 4/1973 |
| FR | 2533084 A | 3/1984 |
| JP | 59067863 A | 4/1984 |
| JP | 3306870 B2 | 5/2002 |
| WO | WO 9961806 A | 12/1999 |

OTHER PUBLICATIONS

Japanese Abstracts of 07327332 A, published Dec. 12, 1995.
European Search Report for European Patent Application Serial No. 03023906.5, mailed Dec. 11, 2003.

* cited by examiner

*Primary Examiner*—Dang Le
(74) *Attorney, Agent, or Firm*—Schulte Roth & Zabel, LLP; Joel E. Lutzker; Anna Vishev (57) ABSTRACT

A rear casing (inner casing) 50 that fits into a front casing (outer casing) 40, where a stator 20 is held between these casings 40 and 50. The front casing 40 and the casing [SIC] 50 are rigidly adhered to each other through caulking, adhesives, or welding. Furthermore, the elastic parts 46 that provide an elastic force on the stator 20 towards the rear casing 50 at the step part 43 of the front casing 40, where the stator 20 is press fitted, and the restorative force of the elastic pieces 46 strongly holds the stator 20.

9 Claims, 5 Drawing Sheets

STEPPING MOTOR

CROSS-REFERENCE TO RELATED APPLICATIONS

This application claims all rights of priority to Japanese Patent Application Serial No. 2002-307271, filed Oct. 22, 2002 (pending).

FIELD OF THE INVENTION

The present invention relates to motors such as stepping motors, and to structures for fastening stators to casings.

BACKGROUND OF THE INVENTION

Hybrid-type stepping motors, for example, are generally structured with a configuration wherein a stator with coils wrapped around a ring-shaped stator stack, which is a pressed stack of thin iron plates, is positioned with a slight gap around a rotor wherein a magnet is attached to a rotor stack which, similarly, is a pressed stack of thin iron plates. In this type of stepping motor, the magnetic polarity of the rotor is attracted to the magnetic polarity of the stator when a current is applied to the coil, causing the rotor to be held in a specific position, where the rotor is rotated in steps by changing the phase of the electric current applied to the coil.

Normally a motor, including the stepping motor described above, has a protective casing that contains the rotor and stator, where a shaft that serves as the output axel and which is attached in the center of the rotor, is held by the casing through a bearing, such as a ball bearing, so as to rotate freely. Well known casing structures include structures wherein there is a single casing formed by bonding into a single unit casing segments wherein the casing was divided along the axial direction of the shaft, and structures wherein the stator stacks of the stators are interposed between the various casing segments so that the stator is secured within the casing when the casing segments are bolted together. (See, for example, Patent Reference 1 and Patent Reference 2.)

The motors disclosed in the publications listed above are complicated in terms of the attachment operations wherein two casing segments are bolted together while the stator is held in a state wherein it is interposed between the two casing segments, and such a motor tends to have an increased number of parts as well. Furthermore, because there is the need for processing by which to fabricate the bolt holes and screw holes for bolting together the various casing segments, there has been a problem in that here has been a large number of manufacturing processes. Furthermore, the metal particles produced when fastening the units by turning the bolt can get into the thin gap between the rotor and the switch, causing problems in rotation. These problems tend to reduce manufacturing efficiency, and thus the development of a technology by which to solve these problems is desirable. Furthermore, in a structure wherein bolts are used to fasten the parts to each other, there has been the danger that the bolts would become lose over long-term operation, tending to lead to rattling and play in the position in which the stator is held.

BRIEF SUMMARY

Consequently, the object of the present invention is to provide a motor that is able to reduce the number of manufacturing processes and the number of parts while making it easy to secure the casing [segments] to each other, and to make it possible to prevent errors in rotation caused by the generation of metal particles as the parts are secured to each other, thereby providing a motor that not only increases the manufacturing efficiency as a result, but that also ensures long-term stability in the way in which the stator is secured.

The motor according to the present is equipped with a cylindrical inner casing and outer casing partitioned in the direction of the axis of rotation of the motor, a shaft supported by bearings on these casings so as to be able to rotate freely, a rotor integrated as a single unit with said shaft, and a ring-shaped stator equipped facing said rotor, and wrapped with coils, where not only is said inner casing fitted into and secured within said outer casing, but said stator is interposed between said casings; where said motor is characterized by said outer casing and said inner casing being secured to each other by caulking, adhesive, or welding, and wherein at said outer casing and/or said inner casing is provided with a force part in order to increase the holding power of said stator by said casings.

The casing of the motor according to the present invention is structured from an outer casing, and an inner casing, which fits into said outer casing, where, with a stator held between these casings, the casings are secured through caulking, adhesive, or welding. Consequently, no bolts are used to fasten the casings together, and thus the various problems described above resulting from the conventional bolted joints are solved. In other words, the work involved in fastening the casings together is simplified, and not only is the number of parts required reduced because the bolts are obviated, but also the need to perform the process for bolting together the casings is eliminated, thereby making it possible to reduce the amount of work in the manufacturing process. Furthermore, because there are none of the metal particles produced while turning the bolts in the bolted joints, the rotating failures [(i.e., seizing)] due to the metal particles can be eliminated. As a result of the above, the manufacturing efficiency is improved.

The stator is secured by being held between the outer casing and the inner casing, but the application of a spring part equipped on at least one of the casings will preserve the state wherein the stator is held firmly between the casings. This makes it possible to maintain the stability with which the stator is held over the long term.

A rotational stop means for the stator can be equipped in the present invention. Specific means include means wherein there are mating protrusions and indentations in the stator and the outer casing. For example, an indented part is fabricated in the stator, and a protruding part that mates with said indented part is fabricated in the outer casing. The inner casing may also be used as the casing with the indentations and protrusions matching the stator, or the both the inside and outer casings may be used in parallel.

The outer casing in the present invention has a large diameter part on the opening side into which the inner casing fits, and a small diameter part on the end surface, where the bearing surface that bears the stator is fabricated on the inner surface of the step part that is the transition from the large diameter part to the small diameter part, where at least one part of a coil is disposed within the space within the small-diameter part. By having the stator in contact with the bearing surface of the outer cylinder, the stator will be held firmly between the casings, and it will be maintained in a state wherein it is held firmly. The spring part, described above, is effective if it is either fabricated on the bearing surface or if the bearing surface itself is strained as the spring part. In addition, disposing at least one part of a coil in the space within the small diameter part makes it possible to increase the space utilization efficiency within the casing, and thus possible to decrease the size of the unit. Furthermore, forming the shape of the bearing surface so that it is in tight contact with the side surface of the stator, makes it possible to both increase the thermal dissipation surface area that dissipates the heat generated in the coils, and to have the spring force improve the thermal conductivity to the heat dissipation part by improving the fit (reducing thermal pockets), having an overall effect of improving the thermal dissipation effect.

The present invention includes configurations wherein the attachment part for attaching said motor to other parts is fastened onto the end plate of the small diameter part of the outer casing, where attachment holes are formed in positions corresponding to the step part in the outer casing for the attachment parts. Attachment parts include, for example, plates, where there are through holes or screw holes, or the like, for attaching said motor to other materials at the attachment holes. Fabricating the attachment holes at a position corresponding to the step part in the casing provides a clearance space for the screws. If no step part is fabricated at the end plate of the outer casing, it would be necessary to fabricate attachment holes after extending the attachment part in the radial direction of the outer casing; however, this is not necessary in the present invention. Consequently, space can be saved.

In addition, in the present invention at least one of the axel bearings, which are each secured to the outer casing and the inner casing, includes a form wherein it is secured in a state that extends towards the outside in the axial direction. In this configuration, it is possible to reduce the height of the motor (i.e., in the axial direction excluding the bearing), without changing the distance between the bearings, or in other words, the bearing span for the bearings that are secured to said casing, making it possible to create a slim form factor. Stated conversely, it is possible to increase the axel bearing span, thereby making the rotation of the rotor even more stable.

When an axel bearing is secured to the outer casing in a form wherein the axel bearing is extending to the outside in the axial direction, as described above, it is then possible to protect the axel bearing with the attachment parts described above. The protection in this case is extremely useful because it covers the bearing and minimizes the part that is exposed to the outside, prevents dirt and other particles from getting into the motor, prevents forces from being applied directly onto the bearing, and prevents physical shock thereto, when the bearing protrudes to the outside from the outer casing. When the protection part that covers the axel bearing on the outer casing also protrudes, the protection part can be used as the centering location for aligning the position with external parts.

The outer casing and inner casing according to the present invention should be fabricated from a sheet metal process from the perspective of ease of processing, and suitability for mass production. Furthermore, the present invention can be used in application to a stepping motor.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which:

FIG. 4(*a*) is a bottom view of the stator, and FIG. 4(*b*) is a top view of the stator stack.

FIGS. 5(*a*) and 5(*b*) are figures showing the front casing, where (a) is a cross-sectional diagram along the section 5A—5A.

FIG. 9(*a*) is a longitudinal cross-sectional diagram showing the structure in an example wherein the elastic material has been changed, and FIG. 9(*b*) is an expanded cross-sectional diagram of the assembled state.

DETAILED DESCRIPTION OF THE PREFERRED EMBODIMENTS AND THE DRAWINGS

Figure 1:
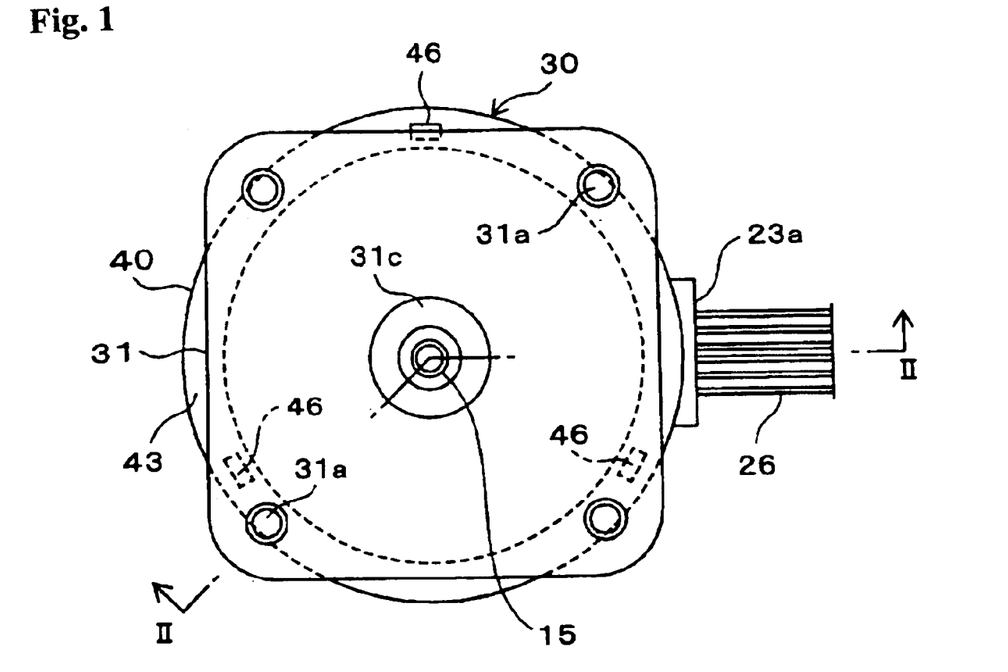
FIG. 1 is a top view of a stepping motor according to an example embodiment of the present invention.
Figure 2:
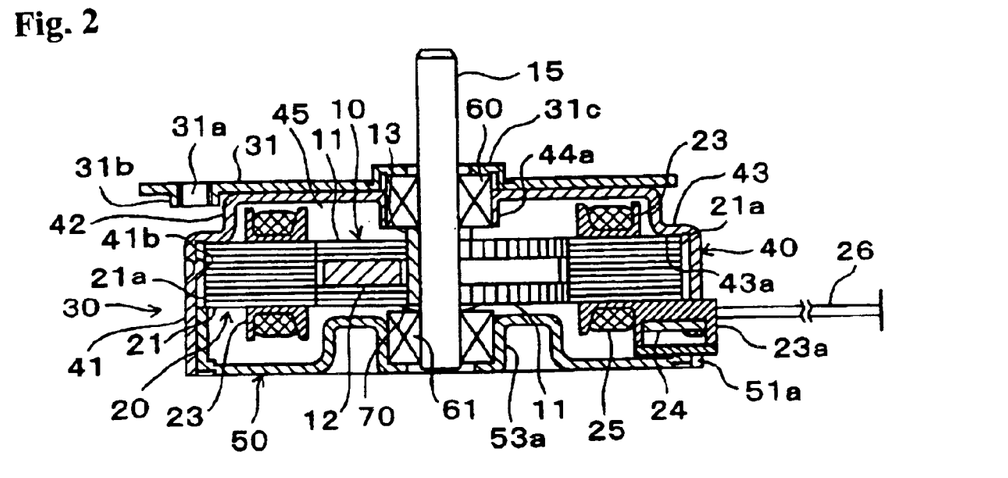
FIG. 2 is a cross-sectional drawing along the section II—II from FIG. 1

An example embodiment of the present invention as applied to a stepping motor will be described below, referencing the figures. FIG. 1 is a top view of a stepping motor according to one example embodiment. FIG. 2 is a cross-sectional diagram along the section II—II in FIG. 1. In FIG. 2, 10 is a rotor, 20 is a stator disposed surrounding the rotor 10, and 30 is a casing that houses the rotor 10 and the stator 20.

As is shown in FIG. 2, the casing 30 is structured from a combination of a cylindrical outer casing (hereinafter termed the "front casing") 40, and an inner casing (hereinafter termed the "rear casing") 50, which fits into the open side of the front casing 40, in the bottom center of the figure. A square front plate (the attachment part) 31, as can be seen in FIG. 1, is secured on the top surface of the front casing 40 using a means such as welding. Through holes are formed using, for example, a boring process in the corners of said front plate 31, and screw holes 31*a* (holes for attachment) are machined in said holes in order to screw said stepping onto external parts. The front plate 31 is fabricated using a boring process, or the like, so that the small protrusions 31*b* face the front casing 40 side. The front plate 31 and the casings 40 and 50 are fabricated, for example, from a elastic plate material such as zinc-plated steel plates, using a press process, which is useful from the perspective of ease of machining and suitability for mass production.

Figure 3:
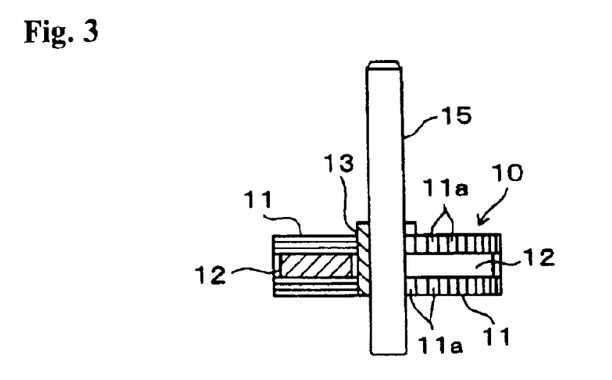
FIG. 3 is a partial cross-sectional diagram of the rotor.

A pair of top and bottom ball bearings (axel bearings) 60 and 61 are mounted in the center of the casing 30, where a rotor 10 is assembled so as to be able to rotate freely on a shaft 15 on these ball bearings 60 and 61. As is shown in FIG. 3, the rotor 10 is secured by being held between two disk-shaped rotor stacks 11, and similarly a disk-shaped permanent magnet 12 is interposed and held there between. A sleeve 13 extends through the center of the rotor 10 and is fastened rigidly therein, where a shaft 15 passes through this sleeve 13 and is fastened rigidly therein. Multiple pole teeth 11a are fabricated with a uniform pitch about the periphery of each of the rotor stacks 11, where each of the rotor stacks 11 are secured using adhesive, or the like, to the permanent magnet 12 in such a way that the pole teeth 11a thereof are offset from each other by an amount equal to one half the pitch. The rigid fastening between the rotor stacks 11 and the sleeve 13, and between the sleeve 13 and the shaft 15, also use means such as adhesive.

As is shown in FIG. 2, the shaft 15, which is rigidly connected to the rotor 10, fits into the inner ring (not shown) of the ball bearings 60 and 61 that are attached, respectively, in the center of the front casing 40 and the center of the rear casing 50. The outer ring (not shown) of the ball bearing 60 is press fitted onto a cylindrical boss 44a fabricated in the center of the front casing 40, where the outer ring (not shown) of the bottom ball bearing 61 is press fitted into the inside of a cylindrical boss 53a fabricated in the center of the rear casing 50. In this case, a portion of the top ball bearing 60 (for example, about ⅓ of the length in the axial direction) extends to the top from the front casing 40. A cover part 31c, which covers the protruding part of the ball bearing 60, is fabricated in the center of said front plate 31. This cover part 31c is used as the centering location for aligning the position with external parts.

As is shown in FIG. 2, a spring 70, for providing pressure in the axial direction against the top and bottom ball bearings 60 and 61, and for determining the position of the shaft 15 and the rotor 10 in the axial direction by applying an upward pressure, is disposed between the outer ring of the bottom ball bearing 61 and the bottom rotor stack 11. In this way, the shaft 15 passes through the front casing 40 and the front plate 31 and extends a specific distance, while not extending from the casing 50, when the rotor 10 is assembled in a state wherein it can rotate freely within the casing 30.

Figure 4:
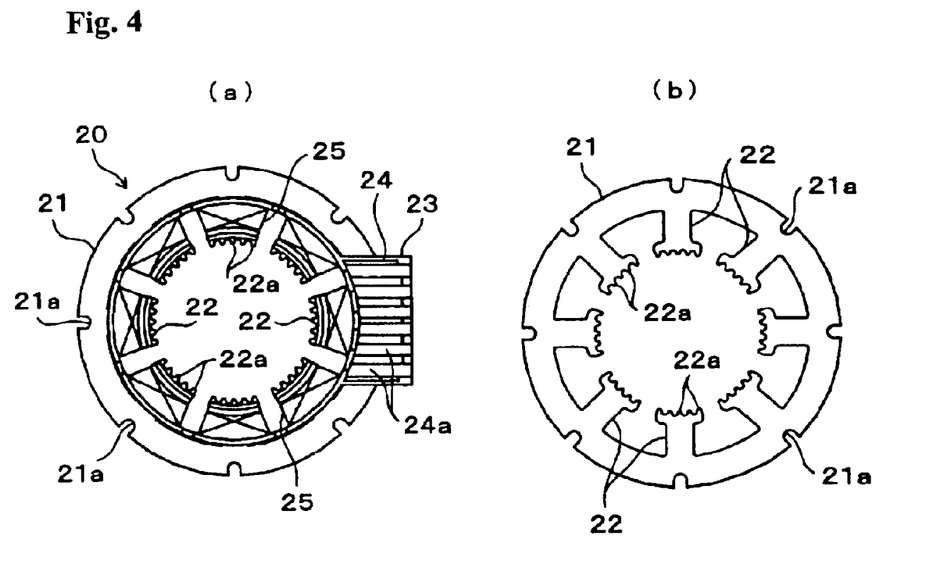

As is shown in FIG. 4(A), the stator 20 is equipped with a ring-shaped stator stack 21 and a coil 25 that is wrapped on said stator stack 21. As is shown in FIG. 4(b), multiple stator poles 22 are fabricated with a uniform pitch about the periphery on the inner periphery on the stator stack 21, where, on the inner peripheral surface of each stator pole 22 there are multiple pole teeth 22a in the peripheral direction. A pair of ring-shaped insulators (see FIG. 2) 23, which cover each stator pole 22, fit into the stator stack 21 from each side, where a coil 25 is wrapped on each of the stator poles 22 covered by these insulators 23.

As is shown in FIG. 2 and FIG. 4(a) a terminal housing 23a is fabricated on the bottom insulator 23, where a terminal port 24 is installed in this terminal housing 23. The terminal port 24 has multiple terminals 24a, where these terminals 24a are connected to the coils 25, and are connected to power and control lead lines 26 from the outside. Multiple grooves 21a (the rotation stop means) extending in the axial direction are fabricated about the outer periphery of the stator stack 21.

As is shown in FIG. 2, the stator 20 is held between the front casing 40 and the rear casing 50, which are segmented in the axial direction, so as to be secured in a state wherein it is positioned concentrically with the outer periphery of the rotor 10 within the casing 30. The front casing 40 and the rear casing 50 will be described below.

Figure 5:
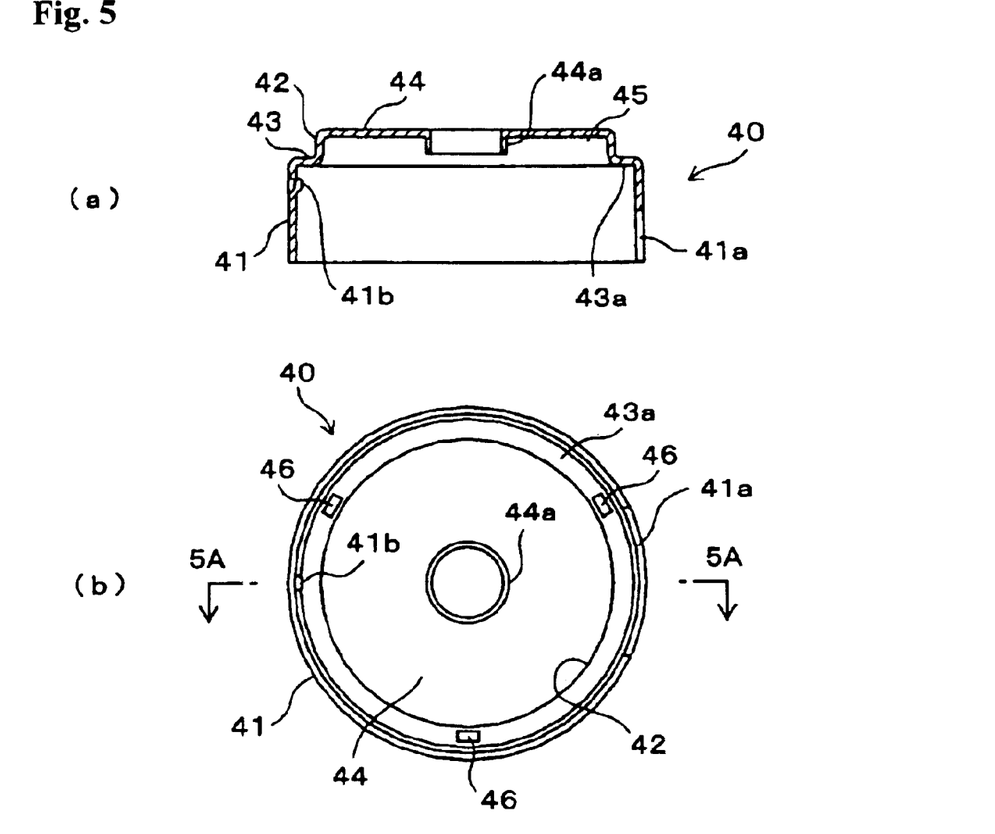

As is shown in FIG. 5, the front casing 40 has a large part 41 on the primary opening side (the bottom side), and a small diameter part 42, fabricated at the top edge side concentric with this large diameter part 41, where the transition between the large diameter part 41 and the small diameter part 42 passes through a horizontal ring-shaped step part 43. The top plate part 44 that forms the end surface of the front casing 40 is fabricated contiguous to the small diameter part 42, where the aforementioned boss 44a is fabricated in the center of said top plate part 44.

The inner surface of the step part 43 is a bearing surface 43a for the stator stack 21, where the top parts of the coils 25 are disposed in the inside space 45 of the small diameter part 42. A notch 41a is fabricated in the large diameter part 41 as clearance space for the aforementioned terminal housing 23a. Furthermore, at a position 180° relative to the notch 41a on the inner periphery surface of the large diameter part 41 there is a protruding part (rotational stop means) 41b. The inner diameter of the large diameter part 41 is set with the stator stack 21 out diameter plus specified insertion tolerances.

Figure 6:
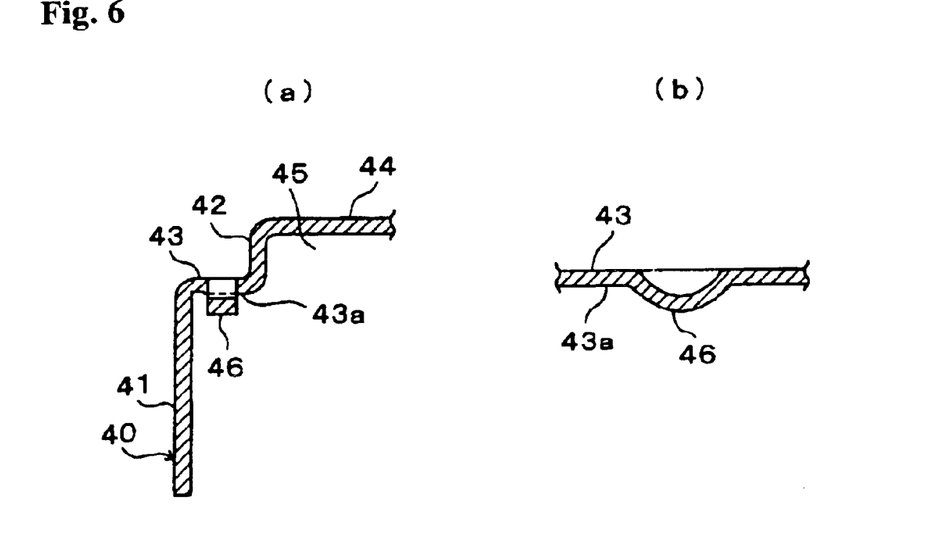
FIG. 6 is a figure showing the elastic pieces and the range thereof in the front casing, where FIG. 6(*a*) is a longitudinal cross-sectional diagram, and FIG. 6(*b*) is a figure showing a horizontal cross-section.

Furthermore, as is shown in FIGS. 6(a) and (b), multiple (in this case, three) elastic pieces (springs) 46 are fabricated so as to protrude downward at the step part 43. The elastic pieces 46 are fabricated with equal spacing about the periphery of the step part 43, as shown in FIG. 1 and FIG. 5(b). These elastic pieces 46 form two slits in the tangential direction, and are fabricated so as to eject the part between the slits.

Figure 7:
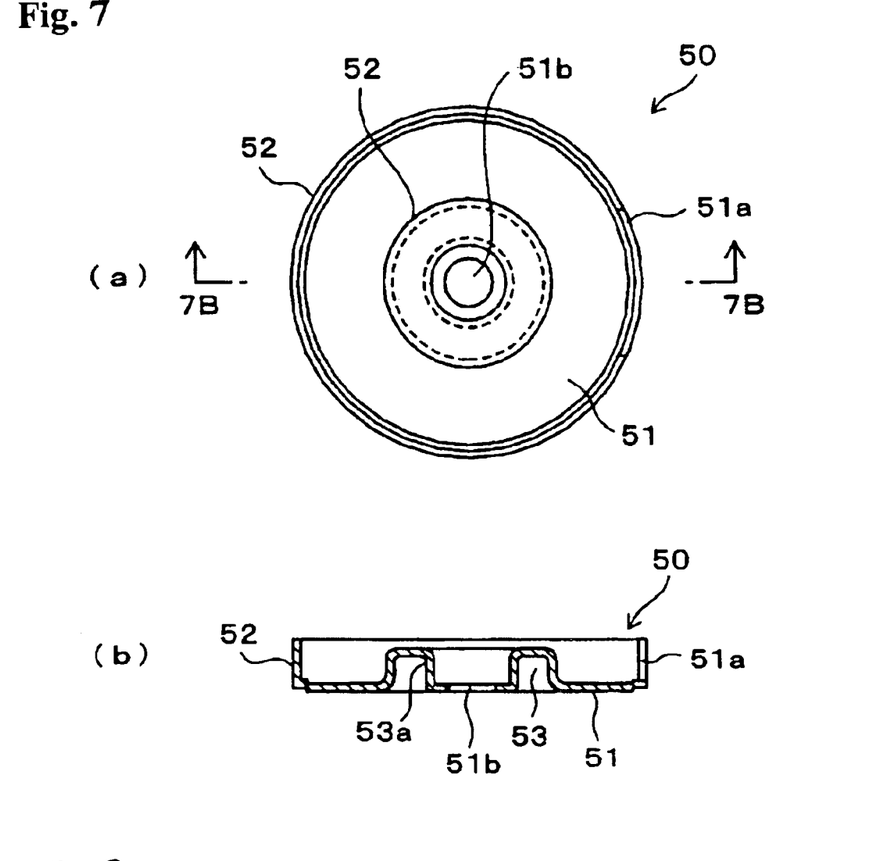
FIG. 7 is a figure showing the rear casing, where FIG. 7(*a*) is the top view and FIG. 7(*b*) is a cross-sectional diagram along section 7B—7B.

On the other hand, as is shown in FIG. 7, the rear casing 50 has a bottom part 51, and a cylindrical part 52 that extends in the upward direction from the periphery of the bottom part 51. A through hole 51b, adequate for the bottom edge part of the aforementioned shaft 15 to extend from the bottom ball bearing, is fabricated in the center of the bottom part 51, where the periphery of the flue hole 51b is formed in a press process to have peripheral grooves 53. The aforementioned boss 53a is formed towards the inside of this peripheral groove 53. A notch 51a is also formed in the cylindrical part 52 of the rear housing 50 as clearance for a terminal housing 23a. The height of the rear casing 50 (i.e., the length in the axial direction) or in other words, the height of the cylindrical part 42, is approximately one half the height of the large diameter part 41 of the front casing 40, roughly the same as the thickness as the stator stack 21. The outer diameter of the cylindrical part 52 of the rear casing is set to a dimension such that it can fit appropriately into the inside of the large diameter part 41 of the front casing 40, including tolerances.

Figure 8:
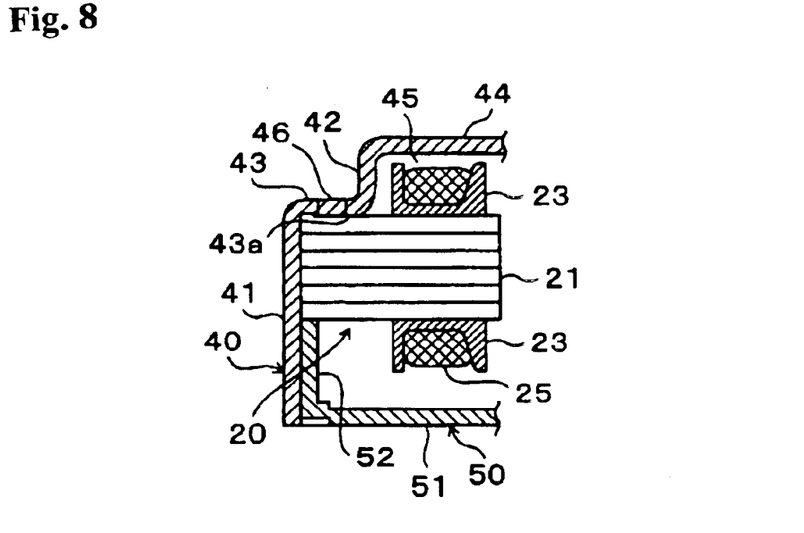
FIG. 8 is an expanded cross-sectional diagram of critical parts in an example embodiment.

In the stepping motor in this example embodiment of the present invention, as shown in FIG. 2, the cylindrical part 52 of the rear casing 50 fits into the bottom part of the inside of the large diameter part 41 of the front casing 40 so that the top end surface of the outer periphery part of the stator stack 21 is in contact with the bearing surface 43a of the front casing 40 in a state, as shown in FIG. 8, wherein the elastic parts 46 of the step part 43 are pushed and subjected to elastic deformation where the bearing surface 43a is in contact with the front casing 40, and the bottom surface thereof is in contact with the top surface edge of the cylindrical part 52 of the rear casing 50. In this way, the stator stack 21 is held between the casings 40 and 50, and thus the stator 20 is held rigidly. Furthermore, the top parts of the coils 25 are disposed in the inside spaces 45 of the small diameter part 42 of the front casing 40. A protruding part and 50. Next, while maintaining this state, the rear casing 50 is caulked to the front casing 40. Note that instead of caulking, spot welding, adhesives, or other rigid connection means could also be used. The rigid connection of the front plate 31 to the front casing 40 can be done in advance, or can be done at the end. Furthermore, an adhesive material is sometimes used at the stator stack and the front casing fit part.

The stepping motor of the present example embodiment is assembled using the procedure described above.

In the present example embodiment, the rear casing 50 is fitted into the front casing 40, and then caulking is performed in order to not only secure the casings 40 and 50 to each other, but also to hold the stator 20 between the casings 40 and 50 to secure it thereby. Because the casings 40 and 50 are secured to each other rigidly without using the bolts that have been used conventionally, the operations to secure these to each other are simpler. Furthermore, because the bolts have been eliminated, not only has the number of parts been reduced, but it is possible to eliminate manufacturing processes because it is not necessary to perform the machining on the casings 40 and 50 required in order to bolt them together. Additionally, because there are none of the metal particles that were produced by turning the bolt, the rotational defects [(i.e. seizing)] due to these particles can be eliminated. With the results described above, the manufacturing efficiency is improved.

The stator stack 21 of the stator, which is held between the front casing 40 and the rear casing 50, and secured thereby, is pushed elastically in the direction 41b on the front casing 40 mates with one of the grooves 21a in the stator stack 21 to prevent rotation, and the terminal housing 23a fits into the notches 41a and 51a in the casings 40 and 50, and a lead line 26 leads to the outside. The rear casing 50 is finally secured rigidly to the large diameter part 41 of the front casing 40 using caulk, adhesive, welding, etc., about the periphery of the bottom part 51.

The various screw holes 31a and the front plate 31 are positioned above the step part 43 of the front casing 40. A part of the cover 51c of the front plate 31 covers the protruding part of the ball bearing 60, as described above.

Next the procedure for assembling this stepping motor will be explained. First the top of the shaft 15, securely fastened to the sleeve 13 and the rotor 10, is inserted into the ball bearing 60, equipped on the front casing 40. Following this, the stator 20 is fitted around the rotor 10, and the terminal housing 23a is fitted into the notch 41a. By fitting the terminal housing 23a into the notch 41a, one of the grooves 21a of the stator stack will mate with the protrusion 41b of the front casing 40.

Next, the spring 70 is equipped on the bottom side of the shaft 14, where, as the rear casing 50, on which the ball bearing 61 is mounted, is fitted into the front casing 40, the bottom of the shaft 15 fits into the ball bearing 61. At this time, the terminal casing 23 is fitted into the notch 51a in the rear casing 50. Furthermore, the rear casing 50 is pushed into the front casing 40, where the various elastic pieces 46 push the stator stack 21 against the bearing surface 43a and cause the stator stack 21 to be held securely between the casings 40 of the rear casing 50 by the elastic parts 46 fabricated at the step part 43 of the front casing 40. The elastic force of the elastic parts 46 compensates for changes in dimensions in the gap between the front casing 40 and the rear casing 50 occurring due to vibrations, shock, or thermal expansion, applying a strong force on the stator 20 at all times, thereby holding the stack [SIC] 20 securely between the casings 40 and 50. Furthermore, even if the force of the rear casing 40 against the stack [SIC] 20 is not uniform, the elastic parts 46 have elastic properties, and thus are able to compensate for the non-uniformities. Because of this, the stator 20 is held between the casing 40 and 50 firmly and with high reliability, without being affected by factors such as vibrations, thermal expansion, assembly method, or the like, and such a status is sustained, with the result that it becomes possible to insure a stable and secure attachment for the stator 20 over the long term.

Furthermore, press fitting the stator stack 21 onto the bearing surface 43a of the front casing 40 causes the stator 20 to be held securely between the casings 40 and 50, where it sustains a state where it is secured strongly. Additionally, locating the coil 25 in the space inside of the small diameter part 42 of the front casing 40 makes it possible to improve the efficiency with which the space within the casing 30 is used, and to reduce the size of the unit.

The screw holes 31a of the front plate 31 are fabricated above the step part 43 of the front casing 40 so that the step part 43 provides clearance for the small protrusions 31b caused by the boring that is used to fabricated the screw holes 31a and to provide clearance for the screws, not shown, that screw into the screw holes 31a. Because of this, it is not necessary to extend the front plate 31 all the way to the outside of the front casing 40 in the radial direction in order to insure clearance for the screws and the small protrusions 31b, making space savings possible. Note that the heads of the screws can be disposed in the clearance above the step part 43, and the screws can be turned with, for example, a wrench, and thus the screw holes 31a in the front plate 31 can simply be through holes, without boring.

The top ball bearing 60 is equipped protruding for some length above the boss 44a on the front casing 40, and thus it is possible to reduce the height of the casing 30 without changing the distance between the top and bottom ball bearings 60 and 61, or in other words, without changing the bearing span, making it possible to make the unit thinner. Stated conversely, the bearing span can be extended, making it possible to increase the stability of the rotation of the rotor 10 as a result. The top ball bearing 60 protruding upward from the front casing 40 is protected by being covered by the cover part 31c of the front plate 31, and thus the chance of dirt or contamination getting into the casing 30 is reduced, and direct forces and shocks on the ball bearing 60 are prevented. Furthermore, the cover part 31c can also function as a centering position for aligning the position with external parts.

Figure 9:
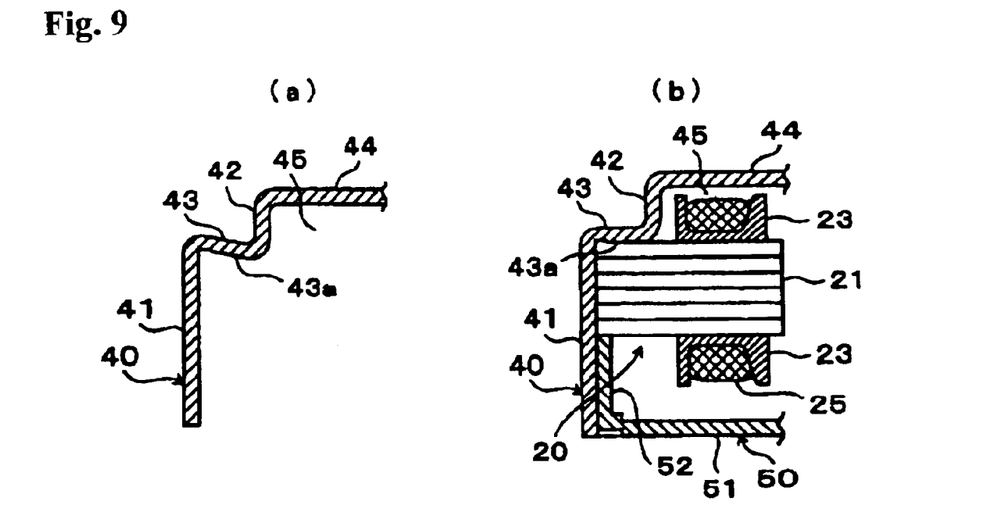

In the example embodiment described above, the elastic parts 46 were one example of a spring part according to the present example in order to hold the stator 20 strongly between the casings 40 and 50, where, instead of the elastic parts 46, a structure such as shown in FIG. 9(a) can be used. In other words, the step part 43 in the front casing 40 can be pulled up in advance towards the top front plate 31 prior to assembly, strained in a state angled diagonally towards the top facing the outer periphery. Given this, when the stator 20 is assembled, the front casing 40 is secured by caulking, adhesive, welding, or the like around the periphery of the rear casing 50 in a state wherein the step part 43 is elastically deformed in the downward direction. FIG. 9(b) shows the assembled state, where, in this state, the step part 43 is constantly attempting an elastic recovery to the front plate 31 side, and as a result, the rear casing 50 receives an effect whereby it is pushed against the front plate 31 side. Consequently, the periphery part of the stator 20 is held strongly and securely, and with a high level of reliability between the casings 40 and 50, where the elastic forces automatically compensate for vibrations, shocks, thermal expansion, or striking other pieces, thus maintaining a state wherein the stator 20 is held strongly and with high reliability through self-compensation through the elastic force, even when there are vibrations, a shock, thermal expansion, striking other pieces, etc.

Figure 10:
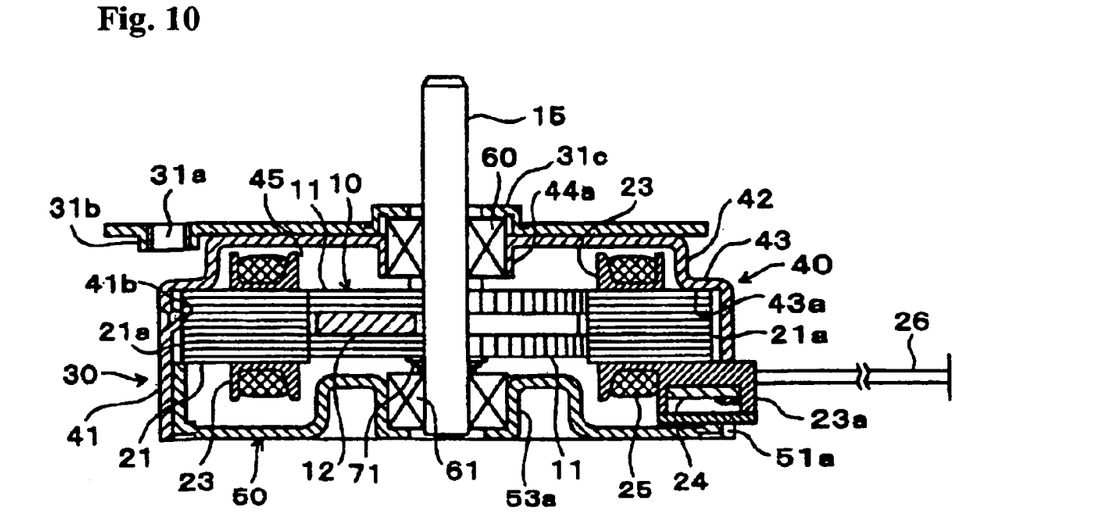
FIG. 10 is a longitudinal cross-sectional diagram of a different example embodiment of a stepping motor according to the present invention.

FIG. 10 shows a modified example of the stepping motor according to the example embodiment above, where the stepping motor in this case uses a torsion spring 71 made from a coiled spring instead of the aforementioned spring 70. Also, the rotor 10 is securely fastened to the shaft 15 directly, instead of using the sleeve 13. Although the stepping motor has a structure slightly different from that which is shown in FIG. 2, above, the fundamental structure where not only does the rear casing 50 fit into the front casing 40, but the stator 20 is held between these casings 40 and 50 is the same, and the results obtained thereby are the same.

As explained above, a motor according to the present invention makes it possible to simplify the joining of the casings to each other because the attachment is performed through caulking, adhesive, or welding an outer casing and an inner casing, which hold a stator, while reducing the number of parts and the number of manufacturing processes and preventing rotational defects [(i.e., seizing)] caused by metal particles generated while attaching the casings to each other, with the effect of the above being that of improving production effectiveness. Furthermore, because an spring part that increases the force by which the casing holds the stator is used at least one of the casings, the present invention makes it possible to secure stable stator attachment characteristics over an extended period of time.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A motor equipped with a cylindrical inner casing and outer casing partitioned in the direction of the axis of rotation of the motor, a shaft supported by bearings on these casings so as to be able to rotate freely, a rotor integrated as a single unit with said shaft, and a ring-shaped stator equipped facing said rotor, and wrapped with coils, where not only is said inner casing fitted into and secured within said outer casing, but said stator is interposed between said casings;

where said motor is characterized by said outer casing and said inner casing being secured to each other by caulking, adhesive, or welding, and wherein at said outer casing and/or said inner casing is provided with a spring part that is pressed against said stator in order to increase the holding power of said stator by said casings.

2. A motor according to claim 1, wherein a rotational stop means for said stator is provided.

3. A motor according to claim 2, wherein said rotational stop means is formed by the mating of indentations and protrusions between said stator and said outer casing and/or said inner casing.

4. A motor according to claim 1, wherein said outer casing has a large diameter part for the opening side into which said inner casing fits, and a small diameter part on the end surface side, where a surface to receive said stator is fabricated on the inner surface of the stage that moves from the large diameter part to the small diameter part, and wherein at least one of said coils is equipped in the internal hollow in the small diameter part.

5. A motor according to claim 1, wherein attachment part for attaching said motor to a fitting part are rigidly secured to the end surface of said small diameter part of said outer casing, where attachment holes are fabricated in a position corresponding to said stage part of the attachment part.

6. A motor according to claim 1, wherein at least one of said bearings secured to said outer casing and secured to said inner casing is secured in a state that is protruding to the outside axial direction.

7. A motor according to claim 6, wherein said bearing is attached to said outer casing in a form wherein protrudes to the outside in the axial direction, and wherein said bearing is protected by said attachment part.

8. A motor according to claim 1, wherein said outer casing and said inner casing are fabricated through sheet metal processes.

9. A motor according to claim 1, wherein said motor is a stepping motor.

* * * * *